United States Patent
Stahl

(10) Patent No.: US 11,387,471 B2
(45) Date of Patent: Jul. 12, 2022

(54) METHOD FOR INCREASING THE SAFETY AND/OR THE RELIABILITY OF THE OPERATION OF A FUEL CELL STACK

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/059,036

(22) PCT Filed: May 10, 2019

(86) PCT No.: PCT/EP2019/062058
§ 371 (c)(1),
(2) Date: Nov. 25, 2020

(87) PCT Pub. No.: WO2019/228785
PCT Pub. Date: Dec. 5, 2019

(65) Prior Publication Data
US 2021/0218041 A1    Jul. 15, 2021

(30) Foreign Application Priority Data
May 30, 2018   (DE) ..................... 10 2018 208 613.3

(51) Int. Cl.
*H01M 8/04089* (2016.01)
*H01M 8/0438* (2016.01)

(52) U.S. Cl.
CPC ..... *H01M 8/04089* (2013.01); *H01M 8/0438* (2013.01); *H01M 2220/20* (2013.01)

(58) Field of Classification Search
CPC ................. H01M 8/04089; H01M 8/0438
(Continued)

(56) References Cited

U.S. PATENT DOCUMENTS

| | | | |
|---|---|---|---|
| 2009/0269635 A1 | 10/2009 | Muramatsu | |
| 2013/0110374 A1 | 5/2013 | Boesch | |
| 2019/0088963 A1* | 3/2019 | Foley | .................. H01M 8/0444 |

FOREIGN PATENT DOCUMENTS

| | | |
|---|---|---|
| DE | 10 2009 018 848 A1 | 10/2009 |
| DE | 10 2012 219 467 A1 | 5/2013 |

(Continued)

OTHER PUBLICATIONS

International Search Report (PCT/ISA/210) issued in PCT Application No. PCT/EP2019/062058 dated Jul. 31, 2019 with English translation (four (4) pages).

(Continued)

*Primary Examiner* — James M Erwin
(74) *Attorney, Agent, or Firm* — Crowell & Moring LLP

(57) ABSTRACT

A method increases the safety and/or the reliability of the operation of a fuel cell stack. The method determines that the fuel cell stack is in a space with a reduced air exchange rate. The method determines consumption information with respect to an oxygen consumption of the fuel cell stack within an interval of time. The method determines, on the basis of the air exchange rate, inflow information with respect to an amount of oxygen which was supplied to the space within the interval of time. The method determines an estimated value for an oxygen content of air in the space on the basis of the consumption information and on the basis of the inflow information.

13 Claims, 2 Drawing Sheets

(58) Field of Classification Search
USPC .......................................................... 429/444
See application file for complete search history.

(56) References Cited

FOREIGN PATENT DOCUMENTS

| | | |
|---|---|---|
| DE | 10 2012 218 572 A1 | 4/2014 |
| DE | 10 2015 206 823 A1 | 10/2016 |
| JP | 2016-80328 A | 5/2016 |
| WO | WO-2013099394 A1 * 7/2013 ............. G05B 15/02 |

OTHER PUBLICATIONS

German-language Written Opinion (PCT/ISA/237) issued in PCT Application No. PCT/EP2019/062058 dated Jul. 31, 2019 (five (5) pages).
German-language Search Report issued in German Application No. 10 2018 208 613.3 dated Dec. 12, 2018 with partial English translation (12 pages).

* cited by examiner

METHOD FOR INCREASING THE SAFETY AND/OR THE RELIABILITY OF THE OPERATION OF A FUEL CELL STACK

BACKGROUND AND SUMMARY OF THE INVENTION

The invention relates to methods for operating a fuel cell stack, in particular in a vehicle.

A vehicle, in particular a road-going motor vehicle, may have a fuel cell system with a fuel cell stack with a multiplicity of fuel cells, wherein the fuel cell system generates electrical energy for the operation, in particular for the propulsion, of the vehicle on the basis of a fuel, such as for example hydrogen.

During the operation of a fuel cell system, oxygen from the air in the surroundings of the fuel cell system is consumed, wherein, during the reaction in the fuel cell system, it is typically the case that water is generated as exhaust gas from hydrogen and oxygen.

The consumption of oxygen may, depending on the ventilation situation in the surroundings of the fuel cell system, lead to a depletion of oxygen in the surroundings of the fuel cell system. Such a depletion of oxygen can jeopardize the safety of a user of the fuel cell system and/or lead to damage to the operation of the fuel cell system.

It is a preferred object of the technology disclosed here to reduce or eliminate at least one disadvantage of a previously known solution or propose an alternative solution. In particular, it is a preferred object of the technology disclosed here to increase the safety and/or the reliability of the operation of a fuel cell system of a vehicle. Further preferred objects may arise from the advantageous effects of the technology disclosed here. The object(s) is/are achieved in each case by means of the subject matter of the independent claims. The dependent claims constitute preferred refinements.

According to one aspect, a method for increasing the safety and/or the reliability of the operation of a fuel cell stack is described. The fuel cell stack may comprise one or more fuel cells. The fuel cell stack may be part of a vehicle, in particular of a road-going motor vehicle. In particular, the fuel cell stack may be configured to generate electrical energy for the operation of a drive motor of a vehicle (on the basis of a fuel, which comprises hydrogen, and on the basis of an oxidant, in particular air). The method may be carried out by a control unit of a vehicle.

The method comprises determining that the fuel cell stack is situated in a space with a reduced air exchange rate, in particular in a garage. For this purpose, movement data relating to the movement of the vehicle in which the fuel cell stack is situated may be ascertained. In particular, a spatial extent of the movement of the fuel cell stack or of the vehicle may be ascertained (and, from this, the spatial extent of a closed space inferred). Alternatively or in addition, position data (for example GPS coordinates) relating to a position of the fuel cell stack and/or of the vehicle may be ascertained. The present position of the fuel cell stack and/or of the vehicle may then be compared with digital map information, in which for example buildings and/or garages and the positions thereof are listed. For example, from the digital map information (for example in the form of a database), it can be determined (that is to say read out) that the fuel cell stack is situated in a space with reduced air exchange rate. It may furthermore be possible for a value of the air exchange rate and/or the volume of the space to be ascertained.

Alternatively or in addition, surroundings data relating to the direct surroundings of the fuel cell stack and/or of the vehicle may be detected (for example on the basis of a surroundings sensor, for example an imaging camera, of the vehicle). The surroundings data may then be evaluated in order to ascertain whether or not the fuel cell stack and/or the vehicle are situated in a closed space.

Alternatively or in addition, signal data relating to shadowing and/or attenuation of electromagnetic signals that are and/or have been transmitted and/or received by the vehicle may be ascertained. For example, presence at a location within a closed space can be inferred from the absence of a previously received signal (that is to say from the lack of receipt of a signal that has previously been received). Alternatively or in addition, input data relating to an input by a user of the fuel cell stack and/or of the vehicle may be detected (for example via a user interface of the vehicle).

It is then reliably possible, on the basis of the movement data, the position data, the surroundings data, the signal data and/or the input data, to determine whether or not the fuel cell stack is situated in a space with a reduced air exchange rate.

Furthermore, the method comprises the ascertainment of consumption information relating to the oxygen consumption of the fuel cell stack within a time interval. The method may be periodically repeated, for example with a certain frequency or repeat rate. The time interval may have the temporal length $\Delta t$ between two repetitions of the method.

In the context of the method, the fuel consumption of the fuel cell stack within the time interval may be ascertained. For this purpose, it is firstly possible for the mass flow of fuel into the fuel cell stack to be ascertained. Furthermore, the quantity of non-reacted fuel in the exhaust gases of the fuel cell stack can be ascertained. From the difference, it is then possible to ascertain the effective fuel consumption of the fuel cell stack.

The consumption information relating to the oxygen consumption of the fuel cell stack can then be ascertained on the basis of a stoichiometry of the reaction between fuel and oxygen in the fuel cell stack (for example in accordance with the reaction formula $2H_2 + O_2 \rightarrow 2H_2O$) and on the basis of the fuel consumption of the fuel cell stack. It is thus possible for the oxygen consumption of the fuel cell stack to be ascertained in an efficient and precise manner.

Furthermore, the method comprises ascertaining, on the basis of the air exchange rate, inflow information relating to the quantity of oxygen that has been fed to the space within the time interval. Here, the quantity of oxygen fed per unit of time typically increases with an increase in the air exchange rate. The air exchange rate may be ascertained on the basis of the position data and on the basis of digital map information, wherein the map information may indicate the air exchange rate for different buildings. Alternatively or in addition, a worst-case assumption may be made regarding the air exchange rate (for example of 0.03 air exchanges per hour, in accordance with SAE).

In the context of the method, volume information relating to an air volume V in the space may be ascertained (for example on the basis of digital map information or on the basis of the surroundings data). In other words, it can be ascertained what volume V of air is situated in the closed space. Furthermore, an oxygen content difference between the oxygen content of air that flows into the space and air that flows out of the space can be ascertained. The oxygen content of air that flows into the space is typically approximately 21%. The air that flows out of the space in the time interval under consideration typically has the most recently ascertained estimated value (ascertained by means of the method) for the oxygen content.

The inflow information relating to the quantity of oxygen that has been fed to the space can then be ascertained in a precise and efficient manner on the basis of the oxygen content difference, the air exchange rate, the volume information and the temporal length $\Delta t$ of the time interval.

Furthermore, the method comprises ascertaining an estimated value for the oxygen content of air in the space on the basis of the consumption information and on the basis of the inflow information (in particular on the basis of the difference between the consumed quantity of oxygen and the fed quantity of oxygen). In particular, on the basis of the inflow information and on the basis of the consumption information, the change in the oxygen quantity in the space within the time interval can be ascertained. The estimated value for the oxygen content (at a point in time $t+\Delta t$) can then be updated on the basis of the change in the oxygen quantity in the space within the time interval (on the basis of the estimated value for the oxygen content at the point in time t).

The ascertainment of consumption information, the ascertainment of inflow information and the ascertainment of the estimated value of the oxygen content may be repeated at a sequence of points in time in order to ascertain estimated values of the oxygen content for the sequence of points in time. Here, the points in time of the sequence of points in time may be temporally spaced apart from one another in each case by $\Delta t$. It is thus possible for the development of the oxygen content in a closed space over time to be monitored in an efficient and reliable manner. Safe and reliable operation of a fuel cell stack can thus be made possible.

To increase the safety and/or the reliability of the operation of a fuel cell stack, the method may in particular comprise initiating and/or carrying out at least one measure in a manner dependent on the ascertained estimated value for the oxygen content, in particular if the ascertained estimated value reaches or falls below an oxygen content threshold value. By way of example, measures are: the outputting of a notification to a user of the fuel cell stack; at least one measure for increasing the air exchange rate of the space; and/or at least one measure for reducing the oxygen consumption of the fuel cell stack.

The air exchange rate may be dependent on operating conditions of the operation of a fuel cell stack, in particular on the pressure in the direct surroundings of the fuel cell stack. In the context of the method, pressure information relating to a pressure within the space relative to a pressure outside the space may be ascertained. In particular, it may be ascertained whether a positive pressure, an equalized pressure or a negative pressure prevails in the space in relation to the external surroundings of the space. The air exchange rate and/or the inflow information may then be ascertained on the basis of the pressure information. It is thus possible for the accuracy of the ascertained estimated value of the oxygen content to be further increased.

During the operation of the fuel cell stack, water vapor is typically discharged as reaction product from the fuel cell stack. In the context of the method, the fraction of the water vapor that condenses in the space may be ascertained. For this purpose, temperature information relating to the temperature of air in the space and/or relating to the temperature of a condensation surface of the space may be ascertained. Furthermore, humidity information relating to the relative air humidity of the air in the space may be ascertained. The fraction of the water vapor that condenses in the space can then be ascertained in a precise and efficient manner on the basis of the temperature information and on the basis of the humidity information (in a manner dependent on a dewpoint table for water).

The pressure information may be dependent on the fraction of the water vapor that condenses in the space. In particular, a negative pressure typically prevails within the space if a relatively high fraction of the water vapor condenses. On the other hand, a positive pressure typically prevails within the space if a relatively low fraction of the water vapor condenses. It is thus possible for the air exchange rate of a space to be updated in a precise manner during the operation of a fuel cell stack, which allows the ascertainment of precise estimated values for the oxygen content.

According to a further aspect, a method for increasing the safety and/or the reliability of the operation of a fuel cell stack is described. The aspects described in this document are also applicable to this method.

The method comprises ascertaining measurement data relating to the operation of a fuel cell stack at a sequence of points in time. It is thus possible to ascertain the profile with respect to time of values of one or more measurement variables. The one or more measurement variables may comprise, and/or the measurement data may indicate: the volume and/or mass flow of the air that is fed to the fuel cell stack (as oxidant); the volume and/or mass flow of fuel (in particular hydrogen) that is fed to the fuel cell stack; the amount of electrical power that is generated by the fuel cell stack; the temperature or the amount of heat that is generated during the operation of the fuel cell stack; the amount and/or the fraction of non-reacted fuel in exhaust gases of the fuel cell stack; and/or an air ratio of the amount of air provided for a reaction of the fuel cell stack.

It is then possible, on the basis of the measurement data at the sequence of points in time, in particular on the basis of the profile with respect to time of the values of the one or more measurement variables, to determine that the oxygen content of air in the surroundings of the fuel cell stack has changed, in particular decreased. In particular, the change with respect to time of the value of one measurement variable in the case of otherwise constant values for one or more other measurement variables may be an indication of a change in the oxygen content in the air that is fed to the fuel cell stack.

The change, in particular the decrease, of the oxygen content may be an indication that the fuel cell stack (in particular the vehicle in which the fuel cell stack is situated) is situated in a closed space with a reduced air exchange rate.

If a change in the oxygen content has been detected, one or more measures for increasing the safety and/or the reliability of the operation of the fuel cell stack may be initiated or carried out. An efficient and reliable increase in the safety and/or the reliability of the operation of a fuel cell stack is thus made possible.

On the basis of the measurement data and on the basis of characteristic data for the operation of the fuel cell stack, an estimated value for the oxygen content of the air in the surroundings of the fuel cell stack can be ascertained. Here, the characteristic data may indicate, for different value combinations of a multiplicity of measurement variables, corresponding estimated values of the oxygen content. The characteristic data may have been ascertained and stored in advance by way of tests on the fuel cell stack. It is thus possible for the oxygen content of the air that is fed to a fuel cell stack to be ascertained in an efficient and precise manner.

The measurement data may relate to a level of humidity within the fuel cell stack. In particular, the measurement data may indicate a level, a duration and/or a frequency of recirculation of water from exhaust gases of the fuel cell stack into the reaction space, in particular to cathodes, of the fuel cell stack. Alternatively or in addition, the measurement data may indicate a level, a duration and/or a frequency of the humidification of anodes and/or cathodes of the fuel cell stack.

On the basis of the measurement data, it is thus possible to ascertain the development of the humidity and/or of the water content within the fuel cell stack. The humidity and/or the water content of a fuel cell stack is typically dependent on the air humidity of the air that is fed to the fuel cell stack as oxidant. In a closed space, the air humidity of the air in the closed space typically increases owing to the water that is discharged from the fuel cell stack. As a result, the humidity and/or the water content of a fuel cell stack also increase if the fuel cell stack is operated in a closed space. Measurement data relating to the level of humidity within the fuel cell stack can thus be considered to be an indication for whether or not the fuel cell stack is being operated within a closed space. Furthermore, from the measurement data relating to the level of humidity, it is possible to infer the oxygen content of the air in the closed space, in particular because the oxygen content decreases with progressive operating duration of the fuel cell stack and the air humidity correspondingly increases with progressive operating duration of the fuel cell stack. Here, the level of the air humidity may increase in a manner inversely proportional to the decreasing oxygen content (if no condensation of discharged water occurs).

It is thus possible, in the context of the method, for an increase of the air humidity of the air in the surroundings of the fuel cell stack to be detected on the basis of the measurement data at the sequence of points in time. It is then possible to reliably determine that the oxygen content of the air in the surroundings of the fuel cell stack has decreased if it has been detected that the air humidity of the air in the surroundings of the fuel cell stack has increased.

According to a further aspect, a device is described which is configured to carry out one or more of the methods described in this document.

According to a further aspect, a road-going motor vehicle (in particular a passenger motor vehicle or a heavy goods vehicle or a bus or a motorcycle) is described which comprises the device described in this document.

According to a further aspect, a software (SW) program is described. The SW program may be configured to be executed on a processor (for example on a control unit of a vehicle) and to thus carry out at least one of the methods described in this document.

According to a further aspect, a memory medium is described. The memory medium may comprise an SW program which is configured to be executed on a processor and to thus carry out at least one of the methods described in this document.

It is to be noted that the methods, devices and systems described in this document may be used both on their own and in combination with other methods, devices and systems described in this document. Furthermore, any aspects of the methods, devices and systems described in this document may be combined with one another in a variety of ways. In particular, the features of the claims may be combined with one another in a variety of ways.

The invention is described in more detail below on the basis of exemplary embodiments.

DETAILED DESCRIPTION OF THE DRAWINGS

Figure 1:
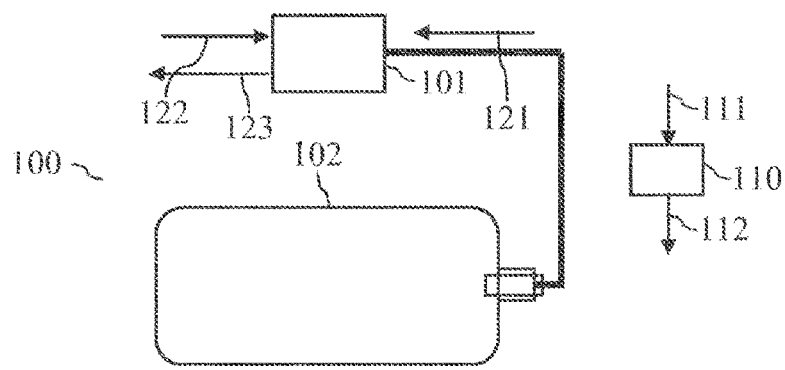
FIG. 1 shows exemplary components of a vehicle.

As discussed in the introduction, the present document is concerned with the reliable and safe operation of a fuel cell system, in particular in a motor vehicle. In this context, FIG. 1 shows exemplary components of a vehicle 100. In particular, FIG. 1 shows a fuel cell stack 101, which typically comprises a multiplicity of fuel cells. The fuel cell stack 101 is configured to generate electrical energy for the operation of a drive motor of the vehicle 100. For this purpose, the fuel cell stack may be fed with fuel 121 from a fuel vessel 102 (in particular from a pressure vessel 102).

A fuel cell of a fuel cell stack 101 comprises an anode and a cathode which are separated by an ion-selective or ion-permeable separator. The anode is supplied with fuel 121. Preferred fuels are: hydrogen, low molecular mass alcohol, biofuels, or liquefied natural gas. The cathode is supplied with oxidant 122. Preferred oxidants 122 are: air, oxygen and peroxides. The ion-selective separator may for example be in the form of a proton exchange membrane (PEM). Use is preferably made of a cation-selective polymer electrolyte membrane. Materials for such a membrane are for example: Nafion®, Flemion® and Aciplex®.

The reaction products (in particular water) generated in the fuel cells of a fuel cell stack 101 can be conducted out of the fuel cell stack 101 as exhaust gases 123 via one or more exhaust-gas channels.

The vehicle 100 furthermore comprises a device 110 for controlling the operation of a fuel cell system with a fuel cell stack 101. For this purpose, measurement data 111 may be ascertained, wherein the measurement data 111 may indicate values of one or more measurement variables. Exemplary measurement variables are the volume flow of fuel 121 and/or oxidant 122 into the fuel cell stack 101;
the electrical power generated by the fuel cell stack 101;
the amount of water within the individual fuel cells; and/or
the amount of non-reacted fuel 121 in the exhaust gases 123.

The device 110 is configured to vary one or more operating parameters 112 of the fuel cell stack 101 on the basis of the measurement data 111. Exemplary operating parameters 112 are the volume flow of fuel 121 and/or oxidant 122 into the fuel cell stack 101;
the duration, the intensity and/or the frequency of flushing cycles for flushing the anodes of the fuel cells with fuel 121 (in order to discharge inert gas and/or condensate); here, the intensity may in particular indicate the mass flow of fuel 121 that is used for the flushing of the anodes;
the air ratio, that is to say the ratio of oxidant 122 to fuel 121; through variation of the air ratio, the amount of water at the cathodes of the fuel cells of a fuel cell stack 101 can be changed; and/or
a humidification and/or drying of the gas fed to the anodes and/or cathodes.

The device 110 may thus ascertain the mass of fed oxidant 122 (in particular air) as measurement data 111 (by way of the parameters of an oxidant-conveying means). Furthermore, the device 110 may ascertain the consumption of fuel 121 as measurement data 111 (by way of the valve and/or injector controller of the fuel cell stack 101). Furthermore, the device 110 may ascertain the generated electrical power of the fuel cell stack 101 as measurement data 111 (in particular by way of the cell voltage and the generated electrical current). Furthermore, the amount of non-reacted fuel 121 (in particular hydrogen) and/or oxygen in the exhaust gas 123 may be ascertained as measurement data 111 by way of corresponding sensor means (for example by way of a lambda probe).

The measurement data 111 may be used by the device 110 to identify a change (in particular a decrease) in the oxygen content within the oxidant 122. For example, an increase in the amount of non-reacted fuel 121 in the exhaust gases 123 (in the presence of otherwise unchanged conditions) is an indication that the oxygen content within the oxidant 122 is decreasing. In particular, a change (in particular a drop) in the oxygen content may be identified by way of the measured air ratio in the exhaust gases 123.

As presented above, during the operation of a fuel cell stack 101, water is typically generated as exhaust gas 123. The operation of a fuel cell stack 101 thus typically leads, in particular in the presence of a depletion of oxygen or in the case of operation of a fuel cell stack 101 in a closed space, to an increase in the air humidity in the air surrounding the fuel cell stack 101, and thus, in effect by way of an external recirculation, to an increase in the air humidity of the gases fed to the cathodes. The increased air humidity thus typically leads to an increased humidity of the fuel cells. The increased humidity within the cells of a fuel cell stack 101 can be detected as measurement data 111.

The device 110 may be configured to adjust the level of humidity of the anodes and/or cathodes of the fuel cells of a fuel cell stack 101 in each case to a particular target value, in particular by closed-loop control. For example, a recirculation of water from the reaction products to the cathodes of the fuel cells may be performed if it is identified that the level of humidity of the cathodes is too low. Alternatively or in addition, humidification of the gases fed to the anodes may be performed if it is identified that the level of humidity of the anodes is too low. It is thus possible, on the basis of the level and/or the frequency of the water recirculation and/or of the anode humidification, to infer a level of the humidity of the fuel cells of a fuel cell stack 101.

Furthermore, from an increased level of humidity of the fuel cells of a fuel cell stack 101, it is possible to infer increased air humidity of the air in the surroundings of the fuel cell stack 101 and thus an oxygen depletion of the ambient air.

The device 110 may thus be configured to identify or determine, on the basis of the measurement data 111 and/or on the basis of the operating parameters 112 during the operation of a fuel cell stack 101, that an oxygen depletion is present. Furthermore, the device 110 may be configured to initiate one or more measures relating to the identified oxygen depletion. Exemplary measures are:

the outputting of an (acoustic and/or visual) warning notification;
one or more measures for increasing the ventilation and/or the air exchange in the surroundings of the fuel cell stack 101; and/or
a restriction, limitation and/or ending of the oxygen consumption by the fuel cell stack 101.

An oxygen depletion may arise in particular if a vehicle 100 with a fuel cell stack 101 is situated within a closed space 200, in particular within a (relatively small) garage.

Figure 2:
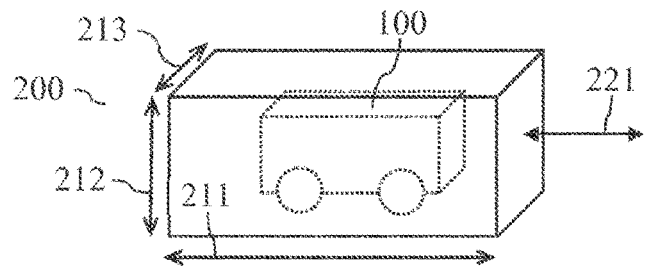
FIG. 2 shows a closed space with a vehicle.

FIG. 2 illustrates an exemplary vehicle 100 with a fuel cell stack 101 within a garage 200 (as an example of a closed space). A garage 200 typically permits a relatively small exchange of gas or a relatively low air exchange rate 221. Furthermore, a garage 200 typically has a relatively small volume V defined by the dimensions 211, 212, 213 of the garage 200.

The device 110 may be configured to, for an operating phase of the fuel cell stack 101 for which presence at a location in a garage 200 cannot be ruled out, ascertain the oxygen concentration within the garage 200. Here, a determined air exchange rate 221 of the garage 200 may be assumed (for example a garage 200 as defined by the SAE, Society of Automotive Engineers, with an air exchange rate 221 of 0.03 air exchanges per hour).

It is thus possible at all times to ascertain an estimated value for the oxygen content in the surroundings of the fuel cell stack 101 (in particular within the garage 200). If a preset oxygen content threshold value is reached or undershot, one or more of the above-stated measures can be initiated.

The device 110 may be configured to determine whether or not a vehicle 100 is situated in a closed space 200 with reduced air exchange rate 221. For this purpose, it is for example possible for the movement of wheels of the vehicle 100 to be analyzed. The movement of the wheels over a distance which is not consistent with typical garage dimensions 211 (for example of 10 meters or more) may be considered as an indication that presence at a location in a garage 200 is not applicable. Alternatively or in addition, position data relating to a present position of the vehicle 100 and/or geographic information (for example digital map information relating to buildings and a road network) may be taken into consideration in order to determine whether or not a vehicle 100 is situated in a garage 200. Alternatively or in addition, the shadowing and/or attenuation of electromagnetic signals may be taken into consideration in order to determine whether or not a vehicle 100 is situated in a garage 200. Alternatively or in addition, a camera and image processing system of the vehicle 100 may be used to determine, on the basis of image data of the surroundings of the vehicle 100, whether or not the vehicle 100 is situated in a garage 200. Alternatively or in addition, on the basis of an input by a user of the vehicle 100, it can be determined whether or not the vehicle 100 is situated in a garage 200.

In particular if it is determined that the vehicle 100 is situated in a space 200 with a reduced air exchange rate 221, the device 110 may be configured to ascertain the present oxygen consumption on the basis of the measurement data 111, in particular on the basis of the present fuel consumption. The ratio of oxygen to fuel 121 is in this case defined by the stoichiometry of the reactions involved, in particular $2H_2 + O_2 \rightarrow 2H_2O$ in the case of a fuel cell.

Figure 4:
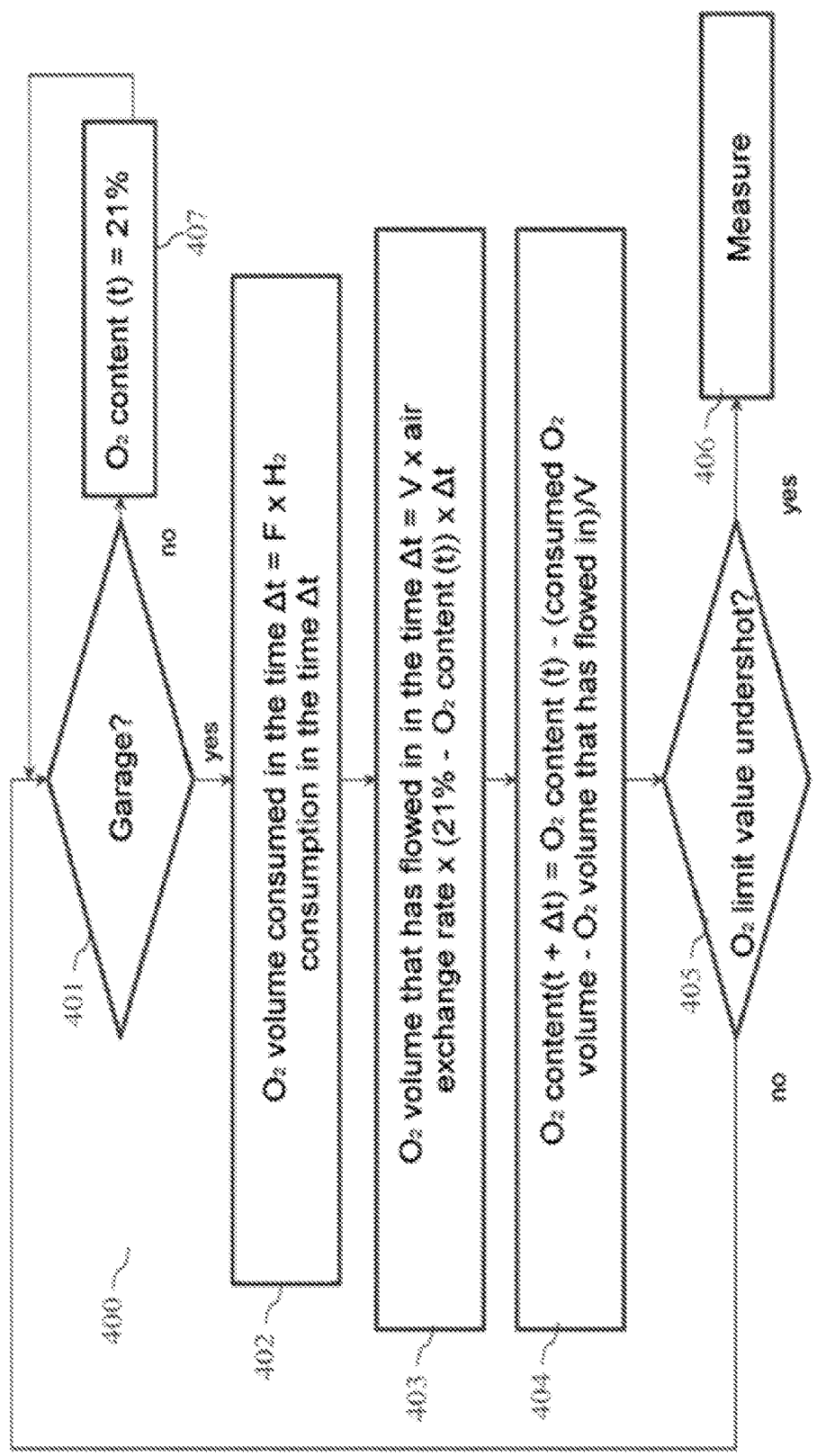
FIG. 4 is a flow diagram of a further exemplary method for operating a fuel cell system.

FIG. 4 shows an exemplary method 400 for ascertaining the oxygen content in the air surrounding a fuel cell stack 101. Here, it can be assumed that the fuel 121 is provided (typically in compressed form) from a vessel 102 with a constant volume. It can thus be assumed that the volume of the container 102 remains constant (even if fuel 121 is being consumed).

In a step 401, it may be determined whether or not the fuel cell stack 101 is situated in a space 200 with a reduced air exchange rate 221. If it is determined that the fuel cell stack 101 is situated in surroundings with an adequately high air exchange rate 221, then, as an estimated value $O_2$ content (t) for the oxygen content at the time t, a base value can be assumed which is typically 21% (step 407).

If, on the other hand, it is determined that the fuel cell stack 101 is situated in a space 200 with reduced air exchange rate 221, then it can be ascertained how much oxygen has been consumed in a time interval with the length $\Delta t$. The consumed oxygen volume can be ascertained on the basis of the measurement data 111. In particular, the consumed volume of fuel 121 can be ascertained (that is to say the $H_2$ consumption in the time interval with the length $\Delta t$). Furthermore, on the basis of the stoichiometry of the reaction in the fuel cells, a factor F can be ascertained which indicates what quantity of oxygen is consumed per quantity of fuel 121. The consumed $O_2$ volume can then be ascertained as a product of the factor F and the $H_2$ consumption in the time interval with the length $\Delta t$ (step 402).

Furthermore, on the basis of the air exchange rate 221, it can be ascertained what quantity of oxygen has newly flowed into the closed space 200 during the time interval $\Delta t$. Here, an exchange of air with full oxygen content (for example with a base value of 21%) and of air with a reduced oxygen content of $O_2$ content (t) typically takes place. From the difference between the base value (of 21%) and the present estimated value $O_2$ content (t) of the oxygen content in the space 200, the amount of oxygen fed per unit volume of air is thus obtained.

The total exchanged volume of air is dependent on the volume V of the closed space 200, on the air exchange rate 221 and on the length $\Delta t$ of the time interval. On the basis of the formula presented in FIG. 4 (see step 403), it is thus possible to ascertain the $O_2$ volume that has flowed in in the time interval $\Delta t$.

The updated estimated value $O_2$ content (t+$\Delta t$) of the oxygen content in the space 200 is then obtained on the basis of the difference between the $O_2$ volume that has flowed in in the time interval and the $O_2$ volume consumed in the time interval, as per the formula presented in step 404.

The updated estimated value $O_2$ content (t+$\Delta t$) can then be compared (step 405) with an oxygen content threshold value or an $O_2$ limit value. Furthermore, in the event of the oxygen content threshold value being undershot, one or more measures may be implemented, in particular in order to prevent a hazard to a user and/or in order to permit reliable operation of the fuel cell stack 101 (step 406).

In the context of the method 400, a distinction may be made as to whether the water vapor generated during the operation of a fuel cell stack 101 remains in the closed space 200 as a gaseous constituent or changes into the liquid phase as a result of condensation. For this purpose, the temperature in the surroundings of the fuel cell stack 101, in particular in the space 200, may be taken into consideration. Alternatively or in addition, it may be taken into consideration whether the space 200 has condensation points and/or condensation surfaces which could cause condensation of the generated water. Furthermore, the temperature of a condensation surface of the space 200 may be ascertained. Alternatively or in addition, the dewpoint table of water may be taken into consideration, which indicates, in a manner dependent on the air temperature and the relative air humidity, the dew point proceeding from which a condensation of water occurs on a condensation surface.

If it is ascertained that the generated water remains (for the most part) in the gaseous state, the water vapor leads to an increase in the volume of gas in the closed space 200 and thus to a positive pressure in the closed space 200. On the other hand, a (predominant) condensation of water vapor leads to a reduction in volume and thus to a negative pressure in the closed space 200.

It is thus possible to ascertain measurement data 111 relating to the condensation of water vapor contained in the exhaust gases 123. The measurement data 111 may indicate the air temperature in the space 200;
the relative air humidity in the space 200; and/or
the temperature and/or the size of one or more condensation surfaces of the space 200.

It is then possible, on the basis of the measurement data 111, to ascertain pressure information relating to the pressure within the space 200 relative to the pressure of the external surroundings of the space 200. In particular, it can be ascertained whether a negative pressure, a positive pressure or no significant pressure difference prevails in the space 200 relative to the external surroundings of the space 200. The air exchange rate 221 may then be adapted in a manner dependent on the pressure data. For example, a minimal gas exchange or a relatively low air exchange rate 221 arises if no pressure difference prevails, for example if in each case half of the substance quantity of the hydrogen generated is generated as gas and the other half is generated as liquid condensate. On the other hand, in particular, a negative pressure typically leads to an increased air exchange rate 221.

The device 110 may be configured to ascertain the volume V and/or the air exchange rate 221 of the respective location at which the vehicle 100 is present by means of geographical data (in particular on the basis of the present position of the vehicle 100 and on the basis of digital map information). Here, the digital map information may indicate the volume and/or the air exchange rate 221 and the position of spaces 200 with reduced air exchange rate 221.

Figure 3:
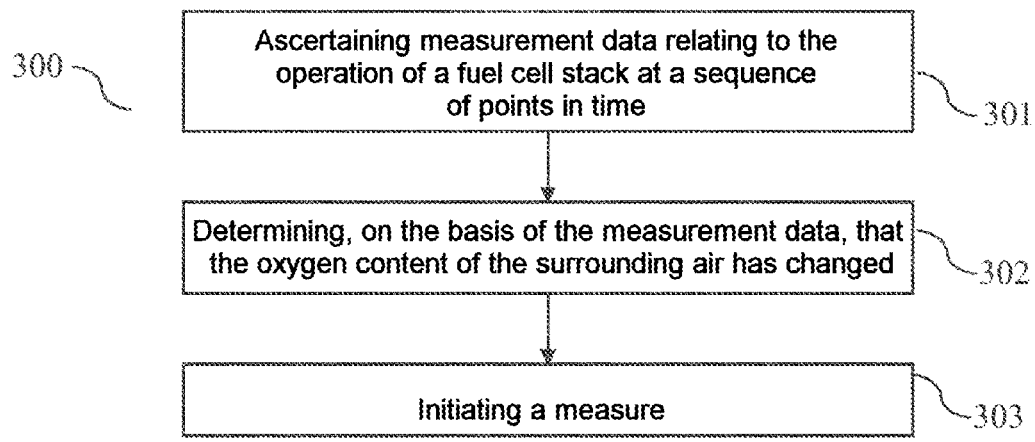
FIG. 3 is a flow diagram of an exemplary method for operating a fuel cell system.

FIG. 3 shows a flow diagram of an exemplary method 300 for increasing the safety and/or the reliability of the operation of a fuel cell stack 101. The method 300 may be carried out by the control unit 110 of a fuel cell stack 101.

The method 300 comprises ascertaining 301 measurement data 111 relating to the operation of a fuel cell stack 101 at a sequence of points in time. It is for example possible for measurement data 111 to be detected and evaluated periodically (for example with a frequency of 0.1 Hz, 1 Hz or more).

Furthermore, the method 300 comprises determining 302, on the basis of the measurement data 111 at the sequence of points in time, that an oxygen content of air in the surroundings of the fuel cell stack 101 has changed, in particular decreased. In particular, a change in the oxygen content can be identified from the profile with respect to time of the measurement data 111. It may be possible for an estimated value for the oxygen content to be ascertained from the profile with respect to time of the measurement data 111 and on the basis of characteristic data for the operation of the fuel cell stack 101. Here, the characteristic data may indicate different estimated values of the oxygen content for different value combinations of measurement variables (for example the mass flow of air 122, the mass flow of fuel 121, the generated electrical power, the amount of non-reacted fuel 121 in the exhaust gases 123, etc.). The characteristic data may be ascertained in advance by means of tests.

Preferably, for the characteristic data, different measurement values are processed in combination in order to obtain an improved estimation for the oxygen content. Here, use may be made of recursive predictor-corrector structures, such as for example Kalman filters, in particular EKF (Extended Kalman Filters) and UKF (Unscented Kalman Filters), owing to the, in part, non-linear parameter relationships. Other approximation methods (gaussian sum filters, projection filters and quadratic filters) or simulations (such as the sequential Monte Carlo methods) may be used in order to provide characteristic data which indicate different estimated values of the oxygen content for different value combinations of measurement variables.

Furthermore, the method 300 comprises, in reaction to the fact that it has been determined 302 that the oxygen content has changed, initiating 303 a measure for increasing the safety and/or the reliability of the operation of the fuel cell stack 101. In particular, a warning notification may be output, and/or the oxygen consumption of the fuel cell stack 101 may be adapted.

The aspects described in this document make it possible to ascertain the oxygen content of the surroundings of a fuel cell stack 101 in an efficient and precise manner. It is thus possible in a reliable manner to identify oxygen depletion and initiate or carry out suitable measures for increasing the safety, the efficiency and/or the reliability of the operation of a fuel cell stack 101.

The present invention is not restricted to the exemplary embodiment shown. In particular, it is to be noted that the description and the figures are intended merely to illustrate the principle of the proposed methods, devices and systems.

What is claimed is:

1. A method for increasing safety and/or reliability of the operation of a fuel cell stack, the method comprising:
   determining that the fuel cell stack is situated in a space with a reduced air exchange rate;
   ascertaining volume information relating to an air volume in the space;
   ascertaining an oxygen content difference between an oxygen content of air flowing into the space and of air flowing out of the space;
   ascertaining consumption information relating to an oxygen consumption of the fuel cell stack within a time interval;
   ascertaining, on the basis of the air exchange rate, the oxygen content difference, the volume information and a temporal length of the time interval, inflow information relating to a quantity of oxygen that has been fed to the space within the time interval; and
   ascertaining an estimated value for an oxygen content of air in the space on the basis of the consumption information and on the basis of the inflow information;
   initiating a measure in a manner dependent on the ascertained estimated value for the oxygen content if the ascertained estimated value reaches or falls below an oxygen content threshold value,
   wherein the measure comprises:
      outputting a notification to a user of the fuel cell stack;
      increasing the air exchange rate; and/or
      reducing the oxygen consumption of the fuel cell stack.

2. The method according to claim 1, further comprising:
   ascertaining pressure information relating to a pressure within the space relative to a pressure outside the space; and
   ascertaining the air exchange rate and/or the inflow information on the basis of the pressure information.

3. The method according to claim 2, wherein
   during the operation of the fuel cell stack, water vapor as reaction product is discharged from the fuel cell stack;
   the method further comprising:
   ascertaining a fraction of the water vapor that condenses in the space, wherein
   the pressure information is dependent on the fraction of the water vapor that condenses in the space.

4. The method according to claim 3, further comprising:
   ascertaining temperature information relating to a temperature of air in the space and/or relating to a temperature of a condensation surface of the space;
   ascertaining humidity information relating to a relative air humidity of the air in the space; and
   ascertaining the fraction of the water vapor that condenses in the space on the basis of the temperature information and on the basis of the humidity information.

5. The method according to claim 1, the method further comprising:
   iteratively repeating the ascertainment of consumption information, the ascertainment of inflow information and the ascertainment of the estimated value of the oxygen content at a sequence of points in time in order to ascertain estimated values of the oxygen content for the sequence of points in time.

6. The method according to claim 1, further comprising:
   ascertaining a fuel consumption of the fuel cell stack within the time interval; and
   ascertaining the consumption information relating to the oxygen consumption of the fuel cell stack on the basis of a stoichiometry of a reaction between fuel and oxygen in the fuel cell stack and on the basis of the fuel consumption of the fuel cell stack.

7. The method according to claim 1, further comprising:
   ascertaining, on the basis of the inflow information and on the basis of the consumption information, a change in the oxygen quantity in the space within the time interval; and
   updating the estimated value for the oxygen content on the basis of the change in the oxygen quantity in the space within the time interval.

8. The method according to claim 1, further comprising one or more of:
   (i) ascertaining movement data relating to the movement of a vehicle in which the fuel cell stack is situated;
   (ii) ascertaining position data relating to the position of the fuel cell stack and/or of the vehicle;
   (iii) ascertaining surroundings data relating to direct surroundings of the fuel cell stack and/or of the vehicle;
   (iv) ascertaining signal data relating to shadowing and/or attenuation of electromagnetic signals that are or have been transmitted and/or received by the vehicle;
   (v) ascertaining input data relating to an input by a user of the fuel cell stack and/or of the vehicle; and
   wherein the method further comprises determining, on the basis of the movement data, the position data, the surroundings data, the signal data and/or the input data, that the fuel cell stack is situated in a space with a reduced air exchange rate.

9. A method for increasing safety and/or reliability of operation of a fuel cell stack, the method comprising:
   ascertaining measurement data relating to the operation of a fuel cell stack at a sequence of points in time, the measurement data relating to a level of humidity within the fuel cell stack;
   detecting, on the basis of the measurement data at the sequence of points in time, an increase in air humidity of air in a surroundings of the fuel cell stack; and
   determining, when it has been detected that the air humidity of the air in the surroundings of the fuel cell stack has increased, that an oxygen content of air in the surroundings of the fuel cell stack has decreased; and,
   in response to the decrease in the oxygen content, initiating a measure for increasing the safety and/or the reliability of the operation of the fuel cell stack, wherein the measure comprises:
  outputting a notification to a user of the fuel cell stack;
  increasing an air exchange rate of the surroundings; and/or
  reducing an oxygen consumption of the fuel cell stack.

10. The method according to claim 9; wherein the measurement data indicate:
  a level, a duration and/or a frequency of recirculation of water from exhaust gases of the fuel cell stack into a reaction space of the fuel cell stack; and/or
  a level, a duration and/or a frequency of a humidification of anodes and/or cathodes of the fuel cell stack.

11. The method according to claim 9, further comprising:
  determining, on the basis of the measurement data and on the basis of characteristic data for the operation of the fuel cell stack, an estimated value for the oxygen content of the air in the surroundings of the fuel cell stack.

12. The method according to claim 11, wherein the measurement data indicate:
  a volume and/or mass flow of air that is fed to the fuel cell stack;
  a volume and/or mass flow of fuel that is fed to the fuel cell stack;
  an amount of electrical power that is generated by the fuel cell stack;
  an amount of non-reacted fuel in exhaust gases of the fuel cell stack; and/or
  an air ratio of the amount of air provided for a reaction of the fuel cell stack.

13. A device for a vehicle, comprising:
  a control unit configured to execute the acts of:
    determining that the fuel cell stack is situated in a space with a reduced air exchange rate;
    ascertaining consumption information relating to an oxygen consumption of the fuel cell stack within a time interval;
    ascertaining, on the basis of the air exchange rate, inflow information relating to a quantity of oxygen that has been fed to the space within the time interval; and
  ascertaining an estimated value for an oxygen content of air in the space on the basis of the consumption information and on the basis of the inflow information; initiating a measure in a manner dependent on the ascertained estimated value for the oxygen content if the ascertained estimated value reaches or falls below an oxygen content threshold value, wherein the measure comprises: outputting a notification to a user of the fuel cell stack; increasing the air exchange rate; and/or reducing the oxygen consumption of the fuel cell stack.

* * * * *